US009055177B2

(12) United States Patent
Huang et al.

(10) Patent No.: US 9,055,177 B2
(45) Date of Patent: Jun. 9, 2015

(54) CONTENT AWARE VIDEO RESIZING

(71) Applicant: Intel Corporation, Santa Clara, CA (US)

(72) Inventors: Chao Huang, Shanghai (CN); Zhikai Song, Shanghai (CN); Yong Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/991,505

(22) PCT Filed: Dec. 28, 2012

(86) PCT No.: PCT/CN2012/087787
§ 371 (c)(1),
(2) Date: Jun. 4, 2013

(87) PCT Pub. No.: WO2014/101081
PCT Pub. Date: Jul. 3, 2014

(65) Prior Publication Data
US 2014/0218609 A1    Aug. 7, 2014

(51) Int. Cl.
*H04N 7/01* (2006.01)
*G06K 9/00* (2006.01)
*G06K 9/32* (2006.01)

(52) U.S. Cl.
CPC .......... *H04N 7/0122* (2013.01); *G06K 9/00765* (2013.01); *G06K 9/3233* (2013.01)

(58) Field of Classification Search
CPC .................................................. H04N 7/0122
USPC .......... 348/445, 581, 561, 704; 382/298, 299; 358/451; 345/472, 660; 715/815
See application file for complete search history.

(56) References Cited

U.S. PATENT DOCUMENTS

| 7,747,107 | B2 * | 6/2010 | Avidan et al. ................. 382/298 |
| 7,873,211 | B1 | 1/2011 | Grundmann et al. |
| 8,184,928 | B2 | 5/2012 | Mrityunjay et al. |
| 8,280,186 | B1 | 10/2012 | Avidan et al. |
| 8,526,764 | B2 | 9/2013 | Knee |
| 2010/0303384 | A1 | 12/2010 | Knee |
| 2011/0091132 | A1 | 4/2011 | Kumar |

OTHER PUBLICATIONS

PCT International Search Report and Written Opinion issued in corresponding PCT/CN2012/087787 dated Oct. 17, 2013, (10 pages).

* cited by examiner

*Primary Examiner* — Jeffrey Harold
*Assistant Examiner* — Jean W Desir
(74) *Attorney, Agent, or Firm* — Trop, Pruner & Hu, P.C.

(57) ABSTRACT

In accordance with some embodiments, jitter accompanying video resizing, can be reduced or even eliminated by analyzing the content that is to be depicted and resizing based on the nature of the content being depicted. As a result, dominant objects in one frame can be handled in a way that reduces or eliminates video jitter or sliding.

27 Claims, 7 Drawing Sheets

CONTENT AWARE VIDEO RESIZING

BACKGROUND

This relates generally to video resizing.

In video resizing, the size of the depicted frame is changed from its original format. For example, the aspect ratio of width to height may be changed. One common resizing changes the aspect ratio from a 4:3 ratio to a 16:9 ratio.

Sometimes, video resizing causes video jitter or slide. In video jitter or slide as a result of resizing, one or more frames may not be aligned with previous or subsequent frames making it appear that depicted objects are moving. This can create a blurred motion effect for objects that, in fact, are not moving from one frame to the next.

BRIEF DESCRIPTION OF THE DRAWINGS

Some embodiments are described with respect to the following figures.

DETAILED DESCRIPTION

In accordance with some embodiments, jitter accompanying video resizing, can be reduced or even eliminated by analyzing the content that is to be depicted and resizing based on the nature of the content being depicted. As a result, dominant objects in one frame can be handled in a way that reduces or eliminates video jitter or sliding.

When a given device, such as a display, receives video, it can analyze the aspect ratio of the received information and compare it to the characteristics of that receiving device. For example, a certain display with a certain aspect ratio may realize that the aspect ratio of the received video is inconsistent with the aspect ratio of that display. Then the receiving device may determine that it would be advantageous to add or delete columns or add or delete rows from the original video to conform to the aspect ratio of the target screen. For example, 254 columns may be added to convert a 4:3 video at 640:480 pixels for display on a 16:9 screen at 854:480. The same techniques can be applied to adding rows and to deleting rows and columns. If the target device resolution is 1920:1080 instead of 854:480, then the source video can also be upscaled before it is sent. Alternatively, the target device may upscale the video.

Figure 1:
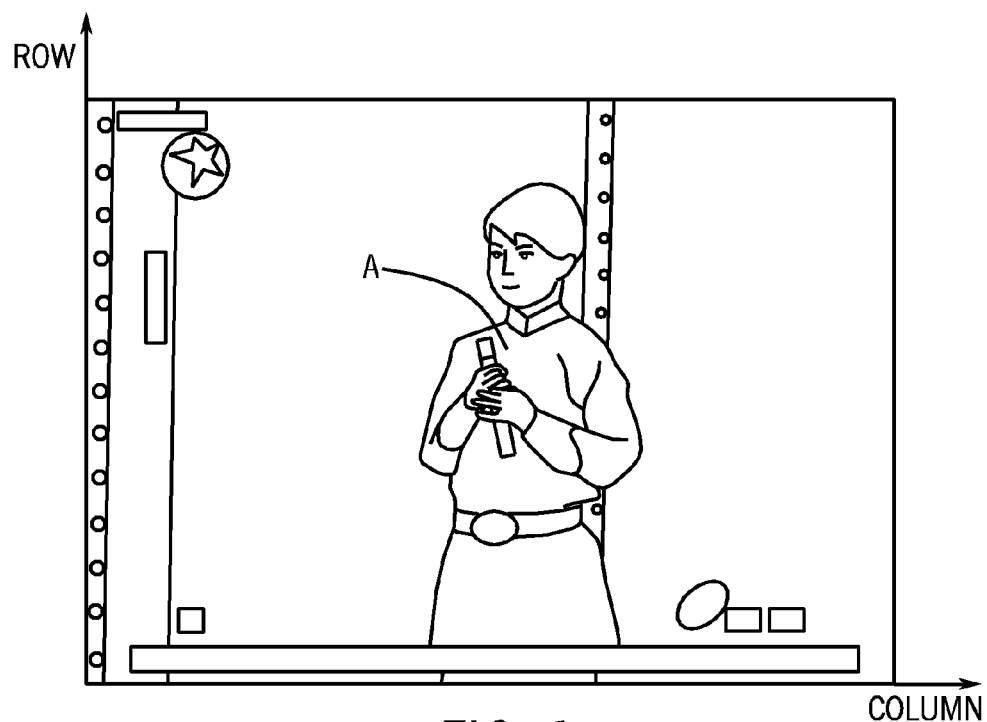
FIG. 1 is a depiction of a frame of video.
Figure 2:
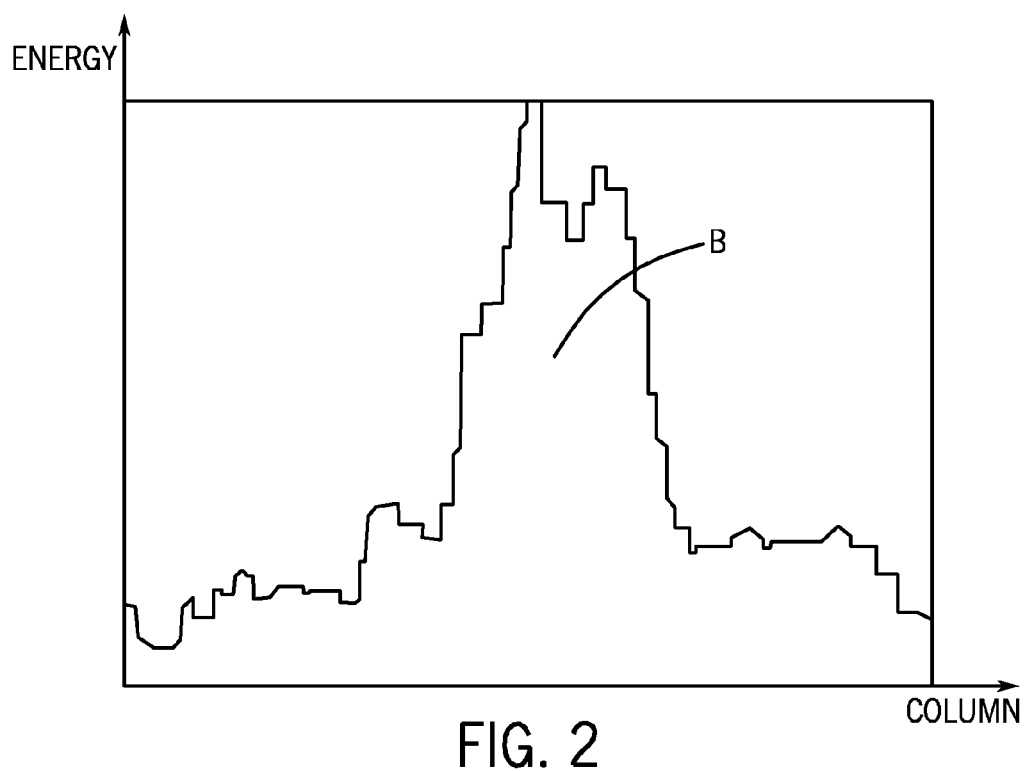
FIG. 2 is an energy depiction for the frame shown in FIG. 1.

Referring to FIG. 1, a video frame showing a person holding a microphone. FIG. 2 is an energy plot for that frame showing energy on the vertical axis for each column of video across the frame on the horizontal axis. The energy, indicated at B, for the foreground depicted object A, is much higher than in the rest of the scene. Thus the object A, shown in FIG. 1 is a dominant depicted object. Generally the higher the energy, the more important is the particular row or column of pixels to the overall depiction. Energy measures how much content may be found along any given vertical row (or column) in the picture relative to other rows (or columns) depicted in the picture. Thus in accordance with some embodiments, rows (or columns) with more energy are changed less often during resizing.

Figure 3:
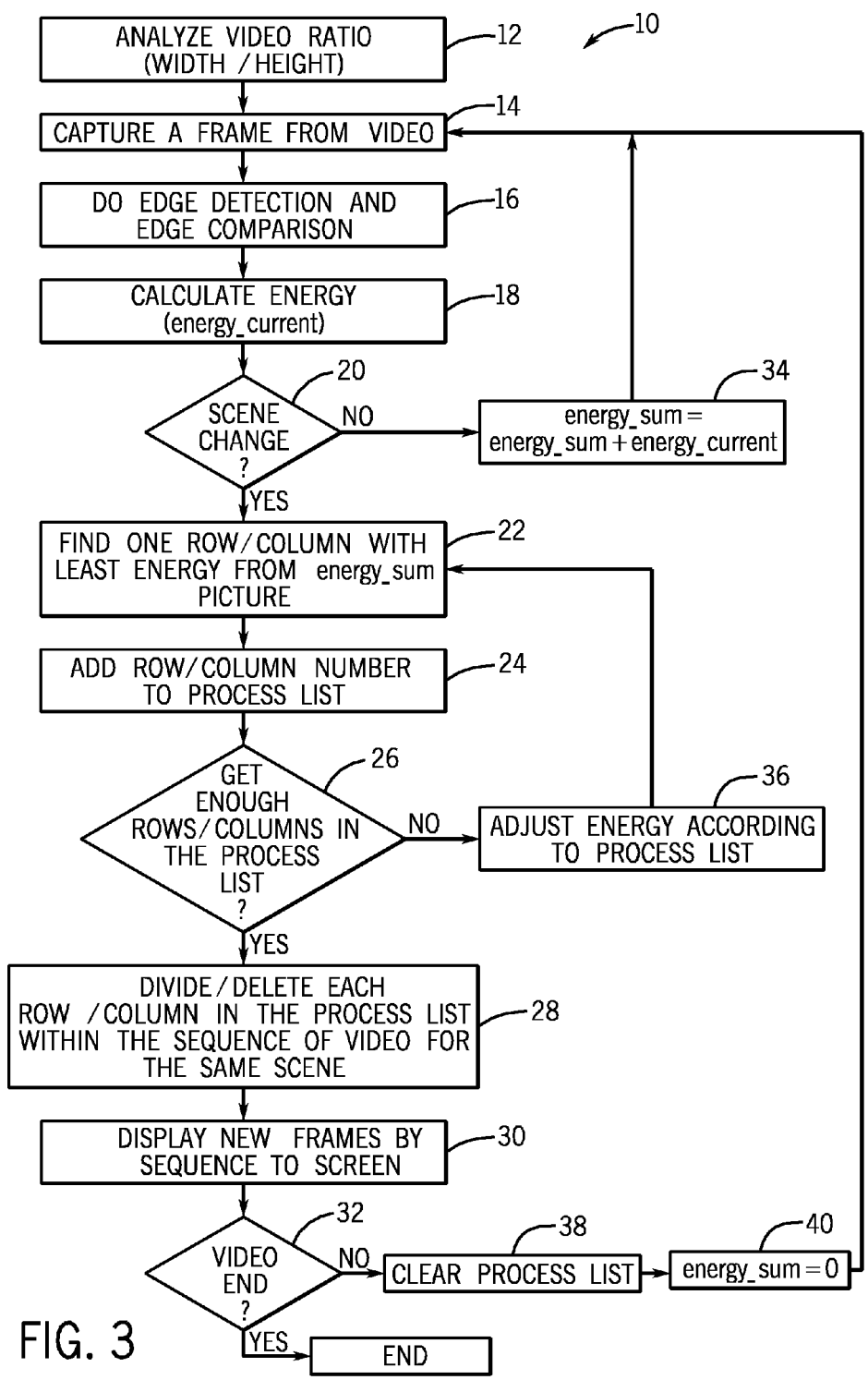
FIG. 3 is a flow chart for one embodiment to the present invention.

According to some embodiments, the sequence shown in FIG. 3 may be implemented in software, firmware and/or hardware. In software and firmware embodiments it may be implemented using computer executed instructions stored in one or more non-transitory computer readable media such as magnetic, optical, or semiconductor storages. For example, one typical storage that may be used is the system memory. However any storage may be used either including stand alone storage or storage associated with a processor-based device.

The sequence shown in FIG. 3 begins by analyzing the video's aspect ratio as indicated in block 12. The video's aspect ratio is a current depicted aspect ratio of the frame in terms of width over height. This aspect ratio information may be encoded with the video in a known way so that it can be extracted. Then a frame from the existing video is captured as indicated in block 14.

Next, an edge detection and edge comparison is done as indicated in block 16. This enables dominant or higher energy objects within the scene to be identified relative to background.

If this is the first frame of video, then no edge comparison is available from a previous frame. The edge comparison may be skipped or the next frame can be captured, the edges detected and the edge comparisons made. In this case, the edge comparison results will be the same for the first two frames.

Any of a variety of different edge detection techniques may be used. A Sobel kernel edge detection uses few processing resources and can be performed quickly. The Sobel kernel also inherently eliminates some noise. Any of a wide variety of different edge detection techniques may be used instead including the Prewitt compass edge detector and the Roberts Cross operator. In some cases, the video compression technique may include edge detection information that can be used instead of or in addition to a Sobel kernel.

Using a detected edge from two successive frames, the edges can be compared, for example as |E1−E2| where E1 is the current frame's edge detection result and E2 is the last frame's edge detection result. The edge comparison effectively tracks movements or changes in the video between frames. These areas of high movement tend to be the areas which users focus on. Accordingly, distortion in those areas is the most objectionable.

While the edge comparison is effective for a sequence of frames of a continuous scene, the edge comparison is not effective when there is a change of scene. In a change of scene or a change of camera view, edges will move drastically to a different part of the frame.

The edge comparison result may be used to calculate the energy of each column (block 18). In a simple example, the absolute value of the edge comparison may be used so that for each pixel, $E_{i,j}=|E1_{i,j}-E2_{i,j}|$, where i and j indicate the row and column of the respective pixel. To calculate the energy of the row, the $E_{i,j}$ values for each pixel in a column can simply be added. This can be expressed mathematically as a sum of all pixels in column (or row) j from i=0 to "height" as follows:

$$f(j) = \Sigma_{i=0}^{height} f(i,j) \qquad \text{Eq. 1}$$

where f(j) is the energy of column j, f(i,j) is the pixel value in the edge comparison result of row i, column j (indicated as the edge comparison result $E_{i,j}$ above), and height is the maximum or top row in the video frame.

One purpose of the energy calculation is to reduce video jitter or sliding. To reduce jitter or slide, the rows/columns of the relevant frames within the same scene are not stretched. For example, in each frame, a column i may be chosen to stretch. Then, in another frame with the same dominant object, it is advantageous to choose that same column i to stretch. Otherwise there is a possibility that viewers will see jitter or sliding.

However if there is a scene change, it is unlikely that viewers would notice any video jitter or sliding regardless of which column was stretched. Thus a check at diamond 20 determines whether there has been a scene change relative to a prior scene. Any conventional scene change detection technique can be used.

Energy_sum is a sum of energy of a sequence of video frames before the current frame. It is a primary value of zero. Energy_current is the energy of the current frame. Thus the energy_sum for a picture is a summation of the energy. It is the sum of the energy of scene M and scene M starts back from frame J and continues to frame K. If there is no scene change (diamond 20), then the energy_sum is set equal to energy_sum plus energy_current at block 34 and the flow iterates. This is to make sure that when the row with the smallest energy is deleted, it is the smallest relative to the whole sequence of frames, not just the lowest in one frame.

Figure 4:
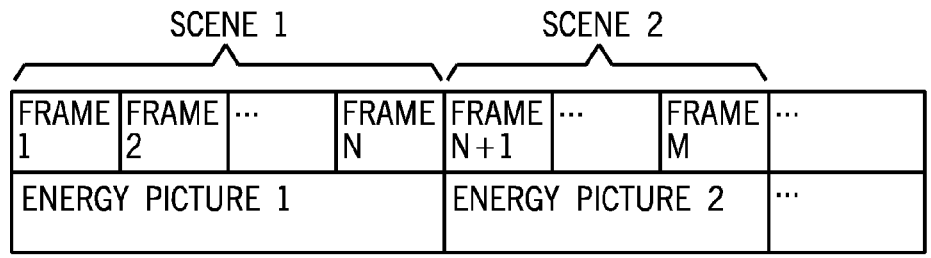
FIG. 4 is an energy picture according to one embodiment.

As shown in FIG. 4, each energy picture relates to a sequence of frames within the same scene. For example, energy picture 1 is a sequence of frames with substantially the same scene and it contains frames 1 through N, while energy picture 2 contains frames N+1 to M.

If there is no scene change, the energy value determined in Equation 1 may be used directly to select columns or rows to stretch or expand (block 22). The adjustment at block 22 reduces video jittering caused by frequently changing the columns that are selected. In order to prevent video jitter, the energy adjustment operation reduces the chance that different columns (or rows) are selected in each frame. It adds a kind of memory or momentum that resists change. As a result, the selected columns (or rows) in one frame should be selected for the next frame.

Figure 5:
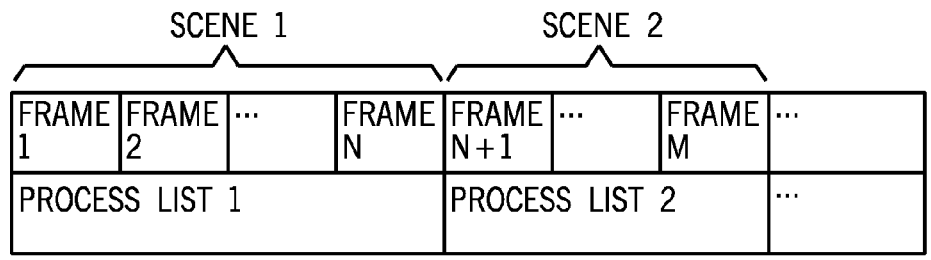
FIG. 5 is another energy picture according to one embodiment.

Next, the row or column number is added to a process list as indicated in block 24. The purpose of the process list is to keep track of what columns were stretched in previous frames. The process list is a list that stores column identifiers for columns that need to be stretched as shown in FIG. 5. The process list is a list of the columns (or rows) which were selected for stretching. A process list may simply be a list of the previously selected columns (or rows). Selected and unselected columns or rows may be stored as a row in a table identified with a frame number from the video sequence.

The resizing video source can find one column (or row) that has the lowest energy value at block 22 and thus has the least effect on jitter. This column (or row) may be the one with the least amount of edge movement, subject to the adjustment using the process list. Any of a variety of techniques can be used to find the lowest value. In one example, heap sort is used to get the smallest value of the energy map. After making the selection, the selected column or row is added to the process list (block 24). The process list keeps track of number of columns or rows that need to be modified.

The selection process at block 22 may repeat as long as more columns or rows are needed (diamond 26) to reach the intended number of columns or rows. In one example, 254 columns are to be added to the frame to resize it from 640 columns to 854. In order to add 254 columns, 254 columns of the frame are selected and these are doubled to form an additional 254 columns. There will be 386 columns that are not selected.

After each column is selected at block 22 and added to the process list (block 24), before another column is selected a further energy adjustment may be made at block 36. In brief, the energy map is adjusted based on the selected column to reduce the likelihood that the same column is added to the process list twice and to reduce the likelihood that the columns next to the selected column are chosen. Since each stretch destroys frame content, it is better to avoid stretching adjacent or neighboring continuous columns.

The energy adjustment at block 36 considers the selected column and then scales the energy of the column on either side of the selected column. This reduces the chance that the adjacent columns will also be selected. However, if the energy of the other columns is still high, the adjacent columns may still be selected. The likelihood of their selection can be adjusted by a scaling factor. This adjustment allows the flow to find the next higher level of energy to identify the next least most energy row or column to delete.

Figure 7:
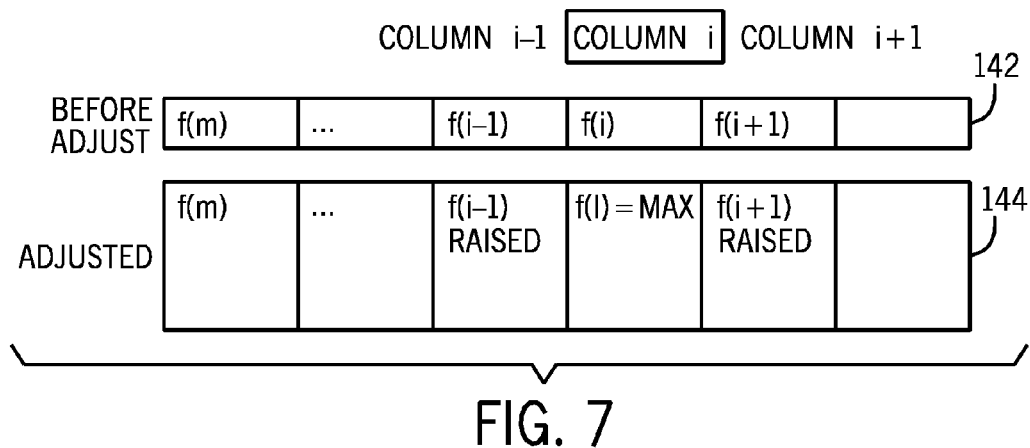
FIG. 7 is a diagram showing adjusting column energy according to one embodiment.

The energy adjustment is diagrammed in FIG. 7. The top row 142 of values represents an energy value list for the current frame. In this example, Column has been selected for the process list with an energy value of f(i), the lowest energy value of the remaining columns at block 22. Accordingly, the energy of the column on the left column i−1 and column i+1 on the right of the selected column is raised to a higher value. This reduces their chance of also being selected for stretching. The higher value can be determined simply by multiplying the existing value f(i−1), f(i+1) by a scaling factor or ratio. A factor in the range of 1.5 to 2.0 has been found to be suitable as a rate. The larger the scaling factor, the more the column selection will be distributed throughout the frame. The higher values are shown in the modified energy table 144.

The energy adjustment may be expressed mathematically as follows:

$$f(i-1) = f(i-1) + \text{rate} \times f(i)$$

$$f(i+1) = f(i+1) + \text{rate} \times f(i) \qquad \text{Eq. 2}$$

where i is the column to be stretched, f(i) is the energy of the column, f(i−1 and f(i+1 are the energies of the columns that neighbor column i and rate is the weighting factor for increasing the energy of adjacent columns.

After enough columns or rows have been selected at block 26, then, at block 28, the selected columns or rows are divided into two or more columns or rows for the present example, or if instead the resized frame is to be smaller, then the columns or rows may be deleted. This is described in more detail below. In one example, a column is converted into two columns. The pixel values for each pixel of the column are averaged between the selected column and the column on either side. More sophisticated averaging, interpolation, or pixel estimation techniques may be used, if desired.

One example of the stretching process may be further described as follows. First a selected column is chosen from the process list of the current frame. The column is used to create two columns. If the selected column is column M, then the two new columns that take its place can be referred to as M' and M".

Figure 8:
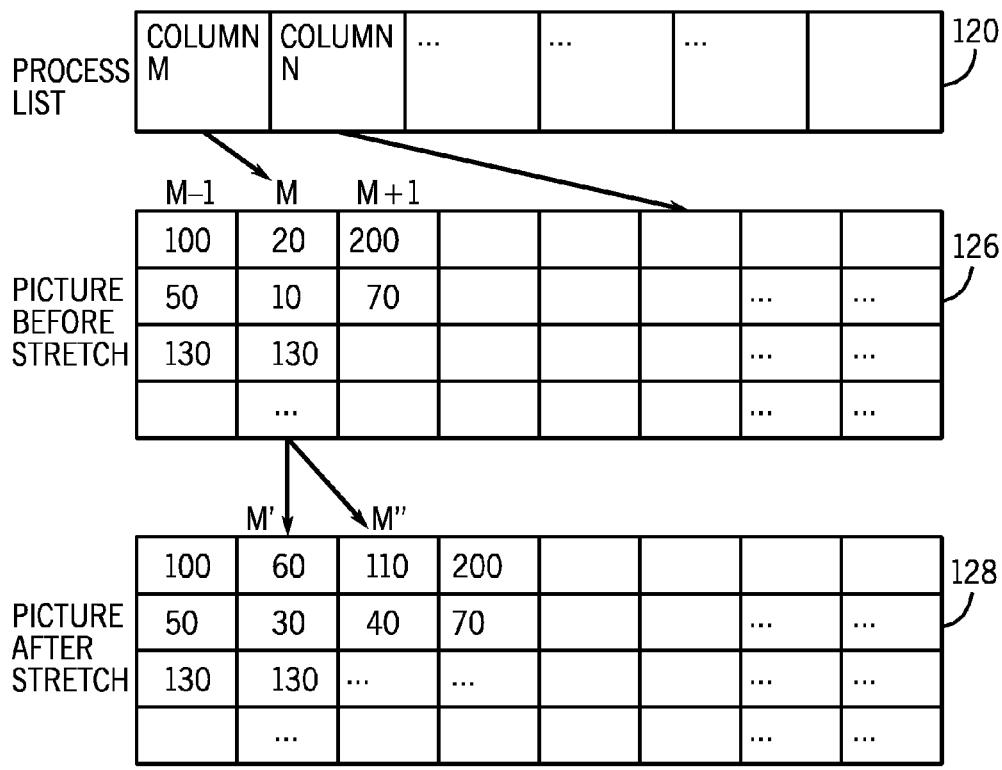
FIG. 8 is a diagram for creating two new columns according to one embodiment.

If M' is to the left of M", then the pixel values for M' may be taken as the pixel values for the original M column adjusted using the pixel values of Column L or, as illustrated in FIG. 8, M−1 immediately to the right of Column M. A simple way to adjust the pixel value is to use an average of the adjacent pixel values as the adjustment. This can be shown mathematically as follows:

$$f(M',y)=0.5(f(M-1,y)+f(M,y))$$

$$f(M'',y)=0.5(f(M+1,y)+f(M,y)) \quad \text{Eq. 3}$$

where f(M',y) and f(M",y) are pixel values in new picture row y, column M' and column M" are the two new columns derived from column M, column M−1 is the column to the left of column M, e.g. column L, and column M+1 is the column to the right of column M, e.g. column N. While Equation 3 shows an average, the average may be weighted so that the original values are more important. For example f(M'y)=0.4 f(M−1,y)+0.6 Ff(M,y), uses a 60/40 weighting emphasizing the original value over the neighboring value. As a further alternative, other techniques may be used to determine pixel values based on additional nearby pixels in the same or in prior and later frames. The particular approach to determining the pixel value in the newly created columns may be adapted to suit different implementations of complexity and video types.

As shown in FIG. 8, the process list 120 is applied to the current video frame in order to stretch the picture by creating two columns of pixels in the place of one column, in this case Column M. As seen in the table 126 of pixel values for the current frame, column M has values 20, 10, and 130 in a particular part of the column. The column to the left, M−1 has values of 100, 50, 130 and the column to the right, M+1, has values of 200, and 70. In the stretched video frame pixel table 128, column M is replaced by two columns labeled M', M". The pixel values are the averages of the column M values with the values on either side. So, for example, for M' the average of 20 and 100 is 60. 60 replaces 100 as the pixel value for the top pixel shown into the diagram of FIG. 8. Similarly, for Column M", the average of 20 and 200 is 110. 110 becomes the pixel value of the top pixel in column M" for the stretched image 128 of FIG. 8.

It may be noted, considering the top line of pixel values for the three columns of the original source frame 126, there is a big change in column M from the adjacent columns. The original row sequence in table 126 is 100, 20, 200. In the stretched video frame 128, the sequence is 100, 60, 110, 200. As a result the information of column M of pixel value 20 is diluted by the neighboring pixel values. This creates a smooth transition for the additional columns but information about the change in value is lost. In other words, this edge in the image will become softened. Since this information is not about a moving edge, the loss of the information will be less noticeable to the viewer. The energy adjustment performed after each column selection at 318 reduces the loss of data caused by the averaging of pixel values by reducing the number of adjacent rows that will be averaged for stretching. As an alternative to the process diagrammed in FIG. 8 and shown in Equation 3, the selected column may simply be replicated. Instead of two columns with averaged values, there are then two columns with same pixel values as the original selected column, 20, 10, 130.

Pixel values are referred to herein as having a single numerical value such as 100, 20, or 200. Pixel values are referred to in this way in order to simplify the description. The pixel values referred to herein are for brightness at a particular position in an image defined by row and column. While some types of video sequences may have a single value for each pixel, typically, there will be multiple values corresponding to RGB, YUV, or some other type of color system. The pixel values may be combined with neighboring pixels in space or time to support some type of video compression including interlacing. Accordingly, a value for a particular pixel as used herein, may refer to a single component at a particular row or column, or it may refer to a value with 2, 3, or 4 color components, depending on the nature of the source video.

Figure 6:
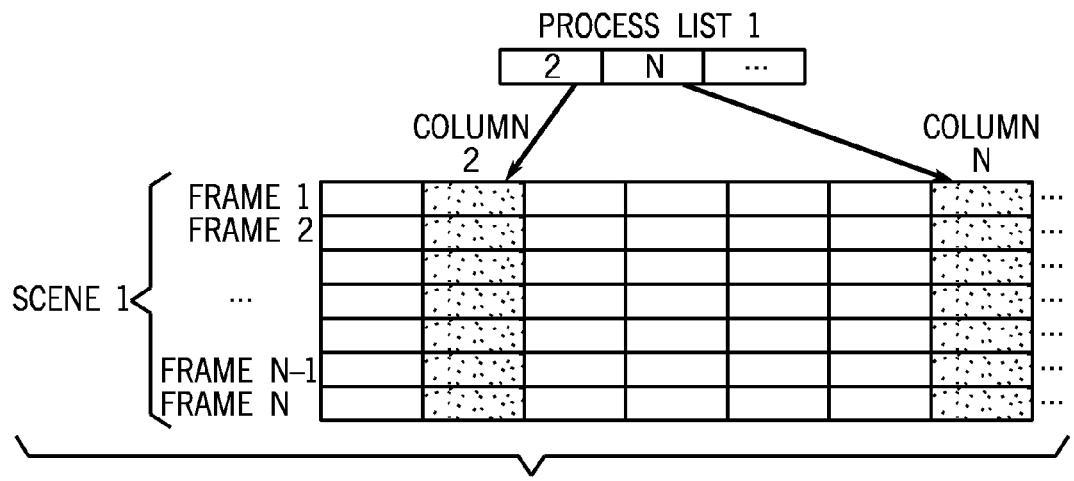
FIG. 6 is a depiction of a frame processing sequence according to one embodiment.

At block 28, all the frames within the same scene are processed using the process list. Frames are processed as indicated in FIGS. 5 and 6. Scene 1 contains frames 1 through N from process list 1 and scene 2 contains frames N+1 to frame M in process list 2. Each process list is related to a sequence of frames with the same scene. Frames with the same scene are processed in the same way to make sure to reduce jitter or sliding. So this is the step where additions or deletions are made to achieve the new aspect ratio.

After all of the selected columns in the process list 120 have been stretched at block 28, the process of FIG. 3 sends the resized video frame to the receiving display device at block 30. If this is not the end of the video at diamond 32, then the process list is cleared (block 38) and energy-sum is initialized (block 40) and stored for use in the next video frame and a new video frame is captured for processing (at block 14). If it is the last frame of the video, then the process ends.

Figure 9:
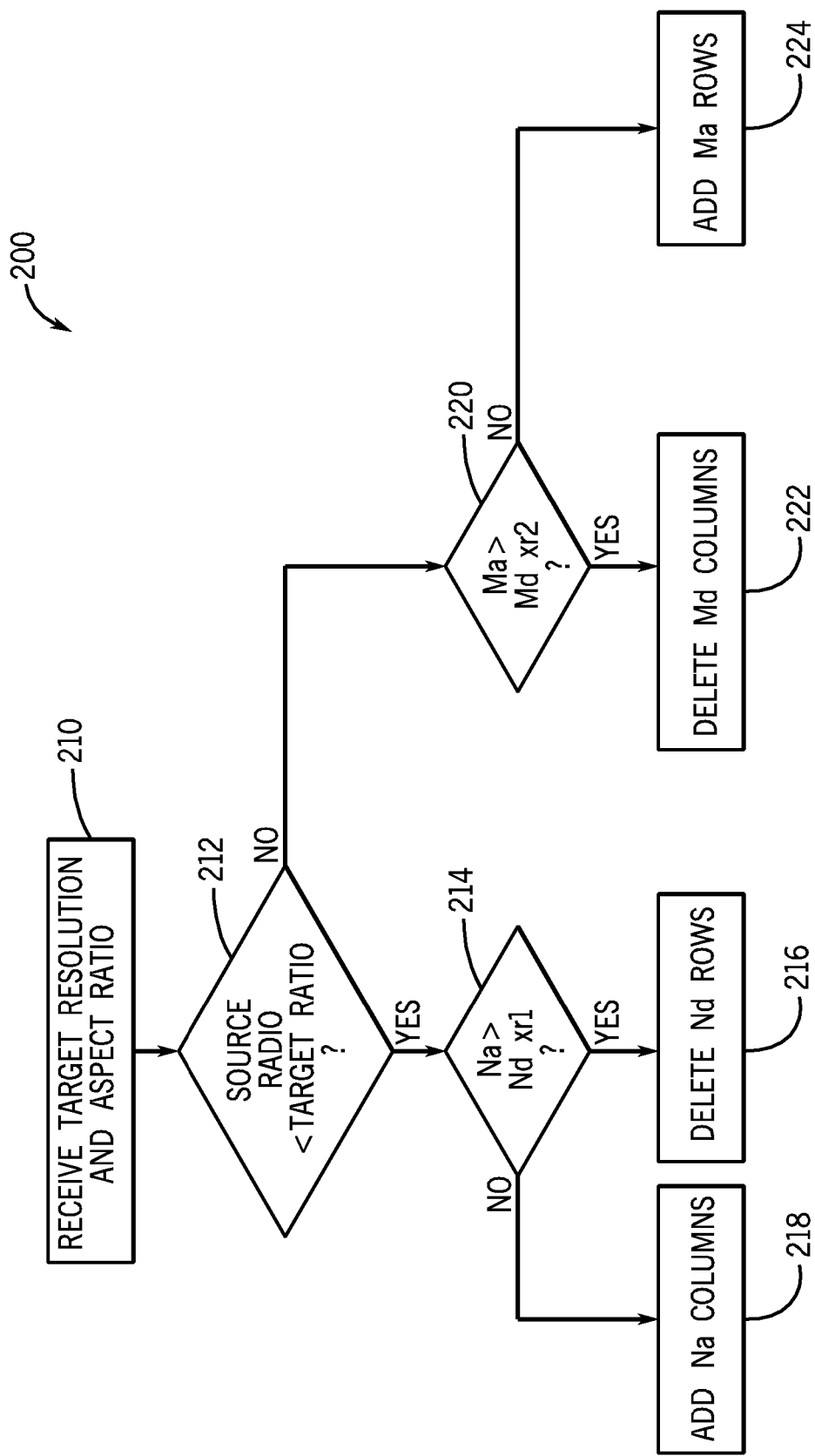
FIG. 9 is a flow chart for one embodiment.

Referring to FIG. 9, there are at least two ways to make a source video match a target aspect ratio. For example, if the original video has a ratio of width to height less than the target ratio, then the original video can be resized either by adding more columns or by deleting rows. For example, consider a video of (640:480) (aspect ratio 4:3) that is to be resized to an aspect ratio of 16:9. It can be changed to a size of (854:480) with 254 columns added or be changed to a size of (640:360) with 120 rows deleted. On the other hand, to convert a video with an aspect ratio of 16:9 to 4:3, either rows can be added or columns can be deleted. By first analyzing which way to resize, the most important information can be protected from loss.

FIG. 9 shows a process at block 12 for determining how to resize the video before sending to a receiving device. At 210, the sender receives the target resolution and aspect ratio. At 212, the resolution and aspect ratio of the source video is compared to that for the target device. If it is smaller, then the number of columns and rows to be added to resize the source or original video for the target device is determined.

At 214, the number of columns, Na, that would need to be added for the target device is compared to the number of rows, Nd, that would need to be added. The number of rows is weighted by a factor, r1, in a direct comparison, however, alternatively, the number of columns may be weighted instead of or in addition to weighting the number of rows. The weight factor biases the comparison in favor of adding columns instead of deleting rows. The factor is based on empirical studies of human perception of what is considered more pleasing. If at 214, the number of columns is less than the weighted number of rows, then at 218 it is determined that columns will be added. If the number of columns to be added is greater than the number of rows to be deleted at 214, then it will be determined that rows should be deleted (block 216). The comparison is to determine how to make the smallest change to the original video by making the smallest change. The weighting factor will bias the decision in favor of adding instead of deleting if the two numbers are close.

Similarly, if the original video is larger than the target video at 212, then the number of rows, Ma, that would have to be deleted is compared at 220 to the number of columns, Md, that would have to be added. As at 214, the number of rows is weighted by a factor, r2, to compensate for human perception. If the weighted number of rows is greater, then at 222 it is determined to delete columns at 222. Similarly if the number of columns is greater, then it is determined to add rows at 224.

The weighting factors can be determined in a variety of different ways and can reflect a comparison of the distortion Dr1 of deleting a row versus the distortion Dc1 of adding a column. The distortion values can be determined by observation and measurement. The weighting factor r1 may then be expressed as a ratio Dr1/Dr2. The factor can be scaled to achieve the desired results. Similarly the weighting factor r2 for adding rows and deleting columns can be determined as a ratio Dr2/Dc2 of the distortion of adding a row compared to deleting a column.

The operations of FIG. 9 may be performed each time a video request is received or each time a source video is received in a different format. Alternatively, the results of a process like that shown in FIG. 9 may be stored in a lookup table. The most common video formats and display device formats may be stored in a lookup table, so that each time the sender is presented with these common formats, the number of columns or rows to be added or deleted may be determined quickly. For example, the conversion from 4:3 VGA resolution to 16:9 WVGA resolution represents common aspect ratios and the result of adding 254 rows can be stored in the lookup table. This allows the sender to act more quickly. The sender may use the lookup table exclusively and present best matches or it may use the lookup table for common scenarios and then apply a process such as that of FIG. 8 for special cases.

Figure 10:
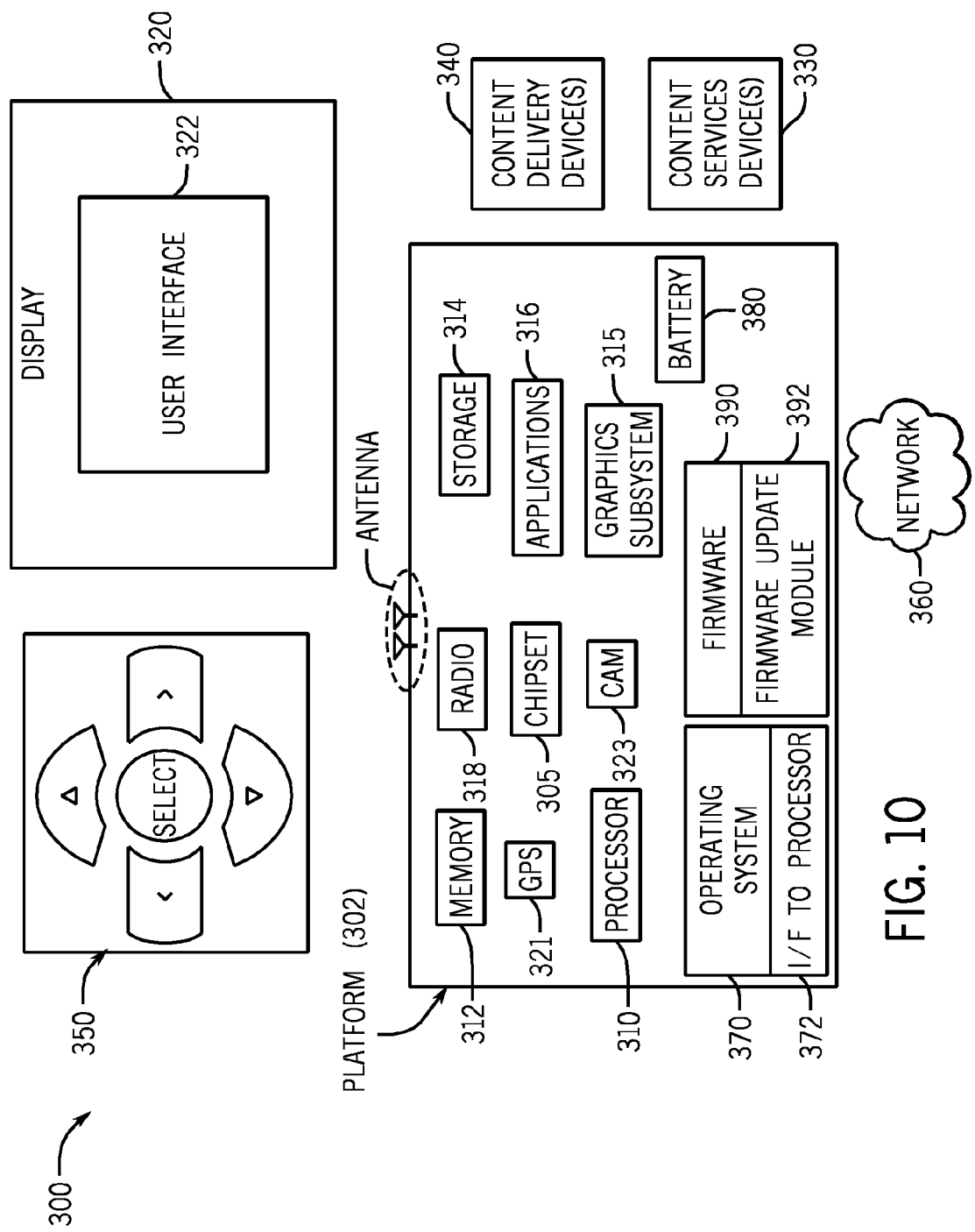
FIG. 10 is a schematic depiction for one embodiment.

FIG. 10 illustrates an embodiment of a system 300. In embodiments, system 300 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth. The processor may implement the sequence of FIG. 3 together with memory 312.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
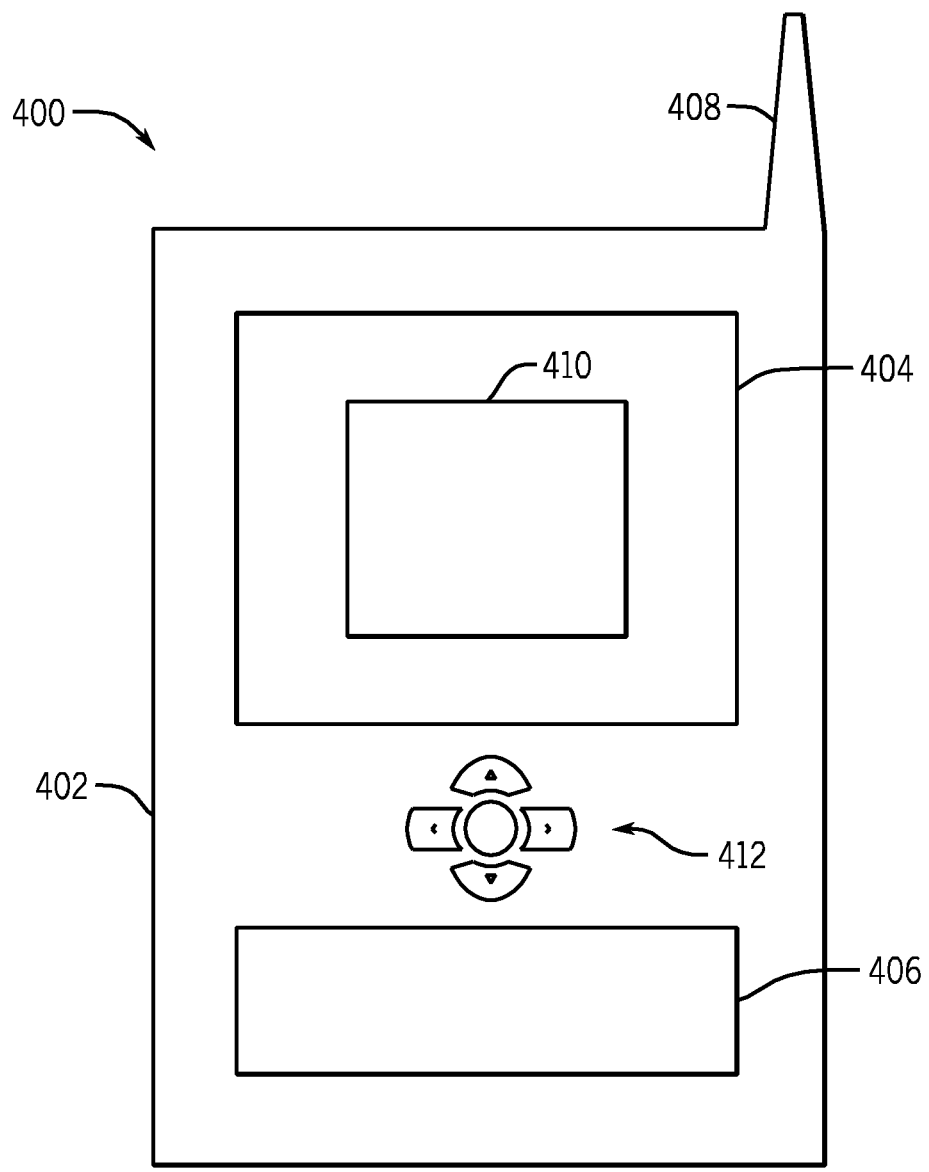
FIG. 11 is a front elevational view of one embodiment.

As described above, system 300 may be embodied in varying physical styles or form factors. FIG. 11 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIG. 2 in software and/or firmware embodiments.

As shown in FIG. 11, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
comparing edges of a first frame with edges of a second frame;
determining an energy of rows or columns of pixels of the second frame based on the comparison;
determining if there is a scene change;
if there is a scene change, selecting columns or rows based on the energy; and
resizing the second frame using the selected rows or columns, wherein resizing comprises creating additional columns using the selected columns by creating two columns to replace each selected column, the pixel values for the created two columns being an average of the pixel values of the selected column with the pixel values of an adjacent column of the second frame.

2. The method of claim 1, further comprising repeating capturing, detecting, comparing, determining, and resizing for each additional frame of the video sequence.

3. The method of claim 1, further comprising sending the resized frame to a video display device.

4. The method of claim 1, wherein resizing comprises deleting columns.

5. The method of claim 1, wherein determining an energy comprises determining an absolute value of the difference in energy between edges of the first and second frame for each pixel in a column and adding the determined absolute values for each edge having pixels in a single column.

6. The method of claim 1 wherein selecting includes selecting rows or columns with lower energy.

7. The method of claim 1, including increasing energy for another iteration if there is no scene change.

8. The method of claim 1 including selecting successively higher energy rows or columns until the needed number of rows or columns has been selected.

9. One or more non-transitory computer readable media storing instructions to cause a processor to perform a sequence comprising:
comparing edges of a first frame with edges of a second frame;
determining an energy of rows or columns of pixels of the second frame based on the comparison;
determining if there is a scene change;
if there is a scene change, selecting columns or rows based on the energy; and
resizing the second frame using the selected rows or columns, wherein resizing comprises creating additional columns using the selected columns by creating two columns to replace each selected column, the pixel values for the created two columns being an average of the pixel values of the selected column with the pixel values of an adjacent column of the second frame.

10. The media of claim 9, said sequence further comprising repeating capturing, detecting, comparing, determining, and resizing for each additional frame of the video sequence.

11. The media of claim 9, said sequence further comprising sending the resized frame to a video display device.

12. The media of claim 9, wherein resizing comprises deleting columns.

13. The media of claim 9, wherein determining an energy comprises determining an absolute value of the difference in energy between edges of the first and second frame for each pixel in a column and adding the determined absolute values for each edge having pixels in a single column.

14. The media of claim 9, wherein selecting includes selecting rows or columns with lower energy.

15. The media of claim 9, the sequence including increasing energy for another iteration if there is no scene change.

16. The media of claim 9, the sequence including selecting successively higher energy rows or columns until the needed number of rows or columns have been selected.

17. An apparatus comprising:
a processor to determine an energy of rows or columns of pixels of a frame, determine if there is a scene change, select columns or rows based on their energy, said processor to determine an absolute value of the difference in energy between edges of the first and second frame for each pixel in a column and add the determined absolute values for each edge having pixels in a single column; use the selected columns or rows to resize the frame; and
a memory coupled to said processor.

18. The apparatus of claim 17 including an operating system.

19. The apparatus of claim 17 including a battery.

20. The apparatus of claim 17 including firmware and a module to update said firmware.

21. The apparatus of claim 17, said processor to compare edges of a first frame with edges of a second frame.

22. The apparatus of claim 17, said processor to select rows or columns with lower energy.

23. The apparatus of claim 17, said processor to increase energy for another iteration if there is no scene change.

24. The apparatus of claim 17, said processor to select successively higher energy rows or columns until the needed number of rows or columns has been selected.

25. A method comprising:
comparing edges of a first frame with edges of a second frame;
determining an energy of rows or columns of pixels of the second frame based on the comparison;
determining if there is a scene change;
if there is a scene change, selecting columns or rows based on the energy; and
resizing the second frame using the selected rows or columns, wherein determining an energy comprises determining an absolute value of the difference in energy between edges of the first and second frame for each pixel in a column and adding the determined absolute values for each edge having pixels in a single column.

26. The method of claim 25, wherein resizing comprises creating additional columns using the selected columns.

27. The method of claim 26, wherein creating additional columns comprises creating two columns to replace each selected column, the pixel values for the created two columns being an average of the pixel values of the selected column with the pixel values of an adjacent column of the second frame.

* * * * *